United States Patent
Schmitt

(10) Patent No.: US 6,715,770 B2
(45) Date of Patent: Apr. 6, 2004

(54) CYLINDER HEAD GASKET HAVING A WELDED-ON OVERLAY

(75) Inventor: Klaus Schmitt, Grünebach (DE)

(73) Assignee: Federal-Mogul Sealing Systems GmbH, Herdorf (DE)

(*) Notice: Subject to any disclaimer, the term of this patent is extended or adjusted under 35 U.S.C. 154(b) by 0 days.

(21) Appl. No.: 10/050,906

(22) Filed: Jan. 18, 2002

(65) Prior Publication Data

US 2002/0093142 A1 Jul. 18, 2002

Related U.S. Application Data

(63) Continuation-in-part of application No. 09/624,208, filed on Jul. 24, 2000.

(30) Foreign Application Priority Data

Jul. 24, 1999 (DE) .......................... 199 34 822

(51) Int. Cl.[7] .................................. F02F 11/00
(52) U.S. Cl. .................. 277/591; 277/592; 277/593
(58) Field of Search .................. 277/590, 591, 277/592, 593, 594, 595, 596, 597, 598; 29/888.3

(56) References Cited

U.S. PATENT DOCUMENTS 4,962,939 A * 10/1990 Lonne et al. ............... 277/601
5,277,434 A * 1/1994 Kestly et al. ............... 277/592
5,628,113 A * 5/1997 Tanaka et al. ............. 277/595
5,755,447 A * 5/1998 Hagiwara et al. ...... 219/121.64
6,164,661 A * 12/2000 Kakuta et al. ........... 219/117.1

FOREIGN PATENT DOCUMENTS

| EP | 0 468 526 | | 1/1992 |
| EP | 0 486 817 | | 5/1992 |
| JP | 406042647 A | * | 2/1994 |
| JP | 07293700 A | * | 11/1995 |
| JP | 407293700 A | * | 11/1995 |

* cited by examiner

Primary Examiner—Anthony Knight
Assistant Examiner—Vishal Patel
(74) Attorney, Agent, or Firm—Venable LLP; Stuart I. Smith

(57) ABSTRACT

A cylinder head gasket includes a metal base plate; a combustion chamber opening provided in the base plate; a metal overlay surrounding the opening; and a weld bonding the overlay to the base plate. The weld is composed of a plurality of weld dots lying in a single row and being equidistantly spaced from one another. Each weld dot has a first diameter on a surface of the base plate and a second diameter on a surface of the overlay. The first diameter is smaller than the second diameter, and a distance between center points of adjoining the weld dots is greater than the second diameter of either of the adjoining weld dots.

6 Claims, 1 Drawing Sheet

CYLINDER HEAD GASKET HAVING A WELDED-ON OVERLAY

CROSS REFERENCE TO RELATED APPLICATION

This application is a continuation-in-part of co-pending application No. Ser. 09/624,208, filed Jul. 24, 2000.

This application claims the priority of German Application No. 199 34 822.7 filed Jul. 24, 1999, which is incorporated herein by reference.

BACKGROUND OF THE INVENTION

This invention relates to a cylinder head gasket including a metal base plate which is provided with at least one combustion chamber opening and a metal annular overlay. The latter surrounds the combustion chamber opening and is welded to the base plate by a series of weld dots configured such that on one surface of the base plate the weld dot diameter is smaller than the weld dot diameter on a surface of the overlay.

At the edge region of the combustion chamber openings of conventional cylinder head gaskets upstanding portions constituted by metal overlays (annular metal disks) are arranged which function as pressure limiting devices for beads provided in the base plate and surrounding the combustion chamber openings. By using such overlays, a high pressure may be produced by the securing bolts which tighten the cylinder block and the cylinder head together, without fully flattening the base plate beads.

Such a cylinder head gasket is described, for example, in European Published Patent Application 0 468 526. Each annular disk (overlay) is, as a prefabricated component, held on the base plate of the gasket by means of a jig and is subsequently bonded to the base plate with a continuous weld seam by means of laser welding.

A welding of thin overlays to the metal plate in the above-outlined conventional manner involves the danger that excessive heat energy is introduced into the metal plate, causing deformation of both the overlays and the metal base plate.

To ensure that only a small amount of heat is introduced into the components, Published European Patent Application 0 468 817 discloses the formation of the weld seam by overlapping weld dots. The overlap seeks to ensure a gas tight bond, similarly to a continuous weld. In case of extremely thin overlays, having, for example, a thickness of less than 120 micron, risks are high that the surface of the overlay is damaged by the overlapping weld dots because the heat energy is excessively high.

SUMMARY OF THE INVENTION

It is an object of the invention to provide an improved cylinder head gasket of the above-outlined type in which extremely thin overlays may be used without adversely affecting the sealing function.

This object and others to become apparent as the specification progresses, are accomplished by the invention, according to which, briefly stated, the cylinder head gasket includes a metal base plate; a combustion chamber opening provided in the base plate; a metal overlay surrounding the opening; and a weld bonding the overlay to the base plate. The weld is composed of a plurality of weld dots lying in a single row and being equidistantly spaced from one another. Each weld dot has a first diameter on a surface of the base plate and a second diameter on a surface of the overlay. The first diameter is smaller than the second diameter, and a distance between center points of adjoining the weld dots is greater than the second diameter of either of the adjoining weld dots.

The weld seam according to the invention is formed by individual weld dots spaced from one another such that they do not overlap. In this manner, less heat energy is introduced thus avoiding a deformation of the overlay. Although the weld seam, in contrast to conventional cylinder head gaskets, is not closed in the circumferential direction, it has been found that such a circumstance has no adverse effect on the sealing function.

It has been found that it is even sufficient to select the distance between two weld dots such that only two weld dots are arranged about a combustion chamber opening.

DESCRIPTION OF THE PREFERRED EMBODIMENT

Figure 1:
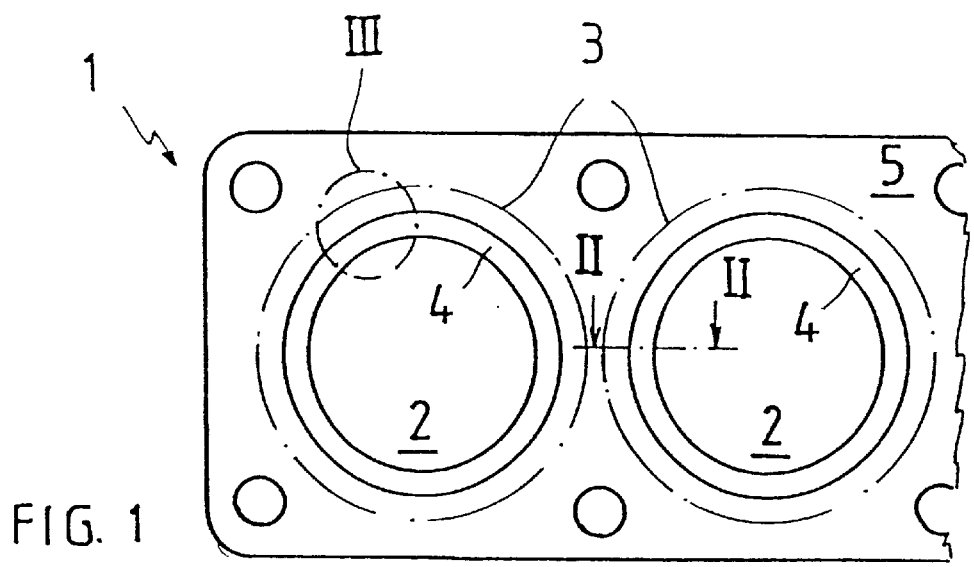
FIG. 1 is a fragmentary top plan view of a cylinder head gasket according to the invention.

Turning to FIG. 1, the cylinder head gasket 1 shown therein serves for sealing the sealing gap between the cylinder head and the cylinder block of an internal-combustion engine. The cylinder head gasket 1 has a plurality of combustion chamber openings 2 which conform to the combustion chamber openings of the engine and which are surrounded by respective beads 3 provided in the single-layer or multiple-layer base plate 5. Each bead 3 surrounds a respective metal overlay 4 welded to the base plate 5.

Figure 2:
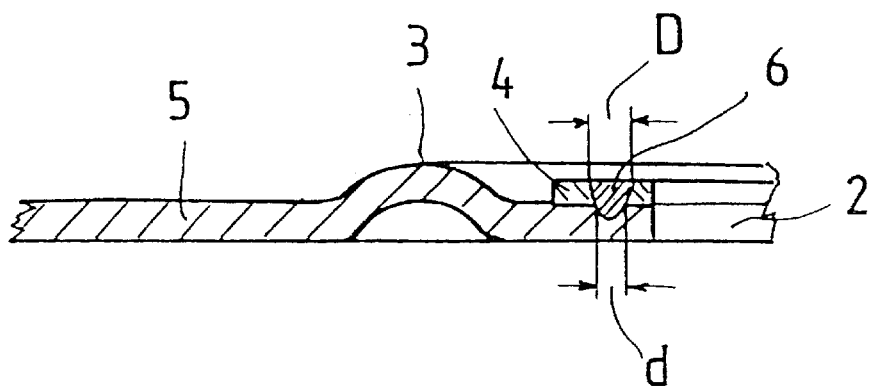
FIG. 2 is a sectional view taken along line II—II of FIG. 1.

As illustrated in FIG. 2, the weld seam is composed of weld dots, each having two different diameters. The weld dot diameter D on the surface of the overlay 4 oriented away from the base plate 5 is greater than the weld dot diameter d on that surface of the base plate 5 which is oriented toward the overlay 4. As an example, D is preferably equal to or less than 0.5 mm and is ideally 0.4 mm.

Figure 3:
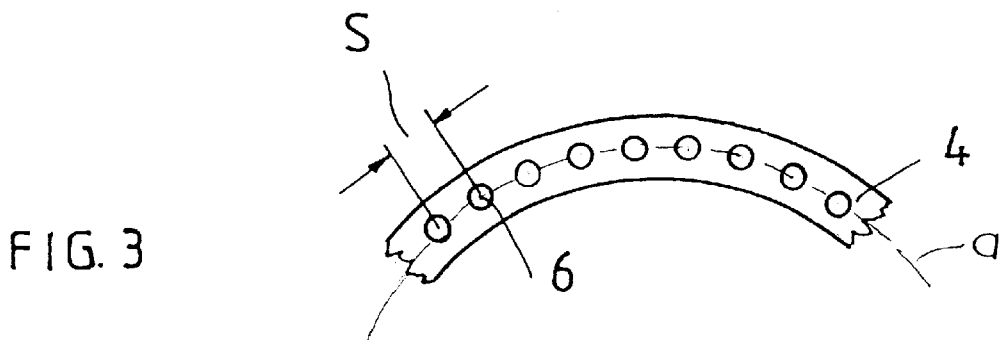
FIG. 3 is an enlarged detailed top plan view of the inset III of FIG. 1.

FIG. 3 shows that the weld dots 6 lie in a single row, that is, on a single circle a whose center coincides with the geometrical center B of the circular overlay 4. Further, the distance S between the center points of adjoining weld dots 6 is so selected that the weld dots do not overlap and do not contact; the distance S which should be greater than 0.5 mm, satisfies the condition $S/D>1$, where D is the diameter of either one of the two adjoining weld dots. The distance S from dot-to-dot is constant along the circumference. By virtue of these relationships according to the invention, extremely thin overlays 4 may be welded without damaging the surface of the base plate 5 or the overlay 4. For example, the overlays 4 may have a thickness of between 50 and 120 micron.

It will be understood that the above description of the present invention is susceptible to various modifications, changes and adaptations, and the same are intended to be comprehended within the meaning and range of equivalents of the appended claims.

What is claimed is:

1. A cylinder head gasket comprising
   (a) a metal base plate;
   (b) a combustion chamber opening provided in said base plate;

(c) a metal overlay surrounding said opening; and (d) a weld bonding said overlay to said base plate; said weld consisting of a plurality of weld dots lying in a single row that surrounds said opening and being equidistantly spaced from one another; each said weld dot having a first diameter on a surface of said base plate and a second diameter on a surface of said overlay; said first diameter being smaller than said second diameter; and a distance between center points of adjoining said weld dots being greater than said second diameter of either of said adjoining weld dots.

2. The cylinder head gasket as defined in claim 1, wherein said second diameter is a maximum of 0.5 mm.

3. The cylinder head gasket as defined in claim 1, wherein said second diameter is 0.4 mm.

4. The cylinder head gasket as defined in claim 1, wherein said overlay has a thickness of between 50 and 120 micron.

5. The cylinder head gasket as defined in claim 1, wherein said overlay is circular and wherein said weld dots lie on a single circle having a center coinciding with the geometrical center of said overlay.

6. The cylinder head gasket as defined in claim 1 wherein said weld dots lie on a single circle that surrounds said opening.

* * * * *